(12) United States Patent
Slach et al.

(10) Patent No.: US 11,898,584 B2
(45) Date of Patent: Feb. 13, 2024

(54) TOOL-LESS FASTENING SYSTEM

(71) Applicant: HNI Technologies Inc., Muscatine, IA (US)

(72) Inventors: Steve Slach, Muscatine, IA (US); Trevor J. Roose, Iowa City, IA (US); Dalton Jones, Muscatine, IA (US)

(73) Assignee: HNI TECHNOLOGIES INC., Muscatine, IA (US)

( * ) Notice: Subject to any disclaimer, the term of this patent is extended or adjusted under 35 U.S.C. 154(b) by 109 days.

(21) Appl. No.: 17/168,693

(22) Filed: Feb. 5, 2021

(65) Prior Publication Data

US 2021/0246925 A1  Aug. 12, 2021

Related U.S. Application Data

(60) Provisional application No. 62/971,581, filed on Feb. 7, 2020.

(51) Int. Cl.
*F16B 12/10* (2006.01)
*A47C 7/42* (2006.01)
(Continued)

(52) U.S. Cl.
CPC ............ *F16B 12/2009* (2013.01); *A47C 7/42* (2013.01); *F16B 2/185* (2013.01); *F16B 12/10* (2013.01);
(Continued)

(58) Field of Classification Search
CPC .. A47C 4/02; A47C 4/021; A47C 7/42; A47B 3/06; Y10T 403/595; F16B 2/185;
(Continued)

(56) References Cited

U.S. PATENT DOCUMENTS 3,989,298 A * 11/1976 Cycowicz ............... A47C 4/02
                                                         297/317
4,060,949 A    12/1977 Heinze
               (Continued)

FOREIGN PATENT DOCUMENTS

DE   20 2011 101 307   * 12/2011   ............... A47B 3/08
EP        2787220 A2    10/2014
               (Continued)

*Primary Examiner* — Michael P Ferguson
(74) *Attorney, Agent, or Firm* — Faegre Drinker Biddle & Reath LLP

(57) ABSTRACT

A tool-less fastening system includes an interface assembly including an interface body having a first longitudinal end, a second longitudinal end, and a contact surface disposed between the first longitudinal surface and the second longitudinal surface, a fastening element coupled to the interface body, and a stop block extending from the interface body at the second longitudinal end, the stop block including an inclined surface. The tool-less fastening system also includes a receiver shaped to receive the interface body. The receiver has a receiver body defining a channel and at least one receiver block extending from the receiver body into the channel, wherein the at least one receiver block includes a receiving surface for receiving the contact surface of the interface body. In some embodiments, the tool-less fastening system can be implemented with shippable furniture, such as office chairs and tables.

19 Claims, 17 Drawing Sheets

(51) Int. Cl.
*F16B 12/20* (2006.01)
*F16B 2/18* (2006.01)
(52) U.S. Cl.
CPC ... *F16B 2012/103* (2013.01); *F16B 2012/106* (2013.01); *F16B 2012/2072* (2013.01); *Y10T 403/595* (2015.01)
(58) Field of Classification Search
CPC .......... F16B 12/10; F16B 12/12; F16B 12/20; F16B 12/32
See application file for complete search history.

(56) References Cited

U.S. PATENT DOCUMENTS

| | | | |
|---|---|---|---|
| 5,135,284 A * | 8/1992 | Crum | A47C 7/42 |
| | | | 297/440.15 |
| 5,419,617 A * | 5/1995 | Schultz | A47C 7/546 |
| | | | 297/DIG. 2 |
| 5,520,441 A * | 5/1996 | Citton | A47C 7/44 |
| | | | 297/463.1 |
| 5,611,637 A | 3/1997 | Brustle et al. | |
| 9,433,296 B2 * | 9/2016 | Gorgi | A47C 4/021 |
| 9,534,623 B2 | 1/2017 | Andersson et al. | |
| 9,771,964 B2 | 9/2017 | Leveen et al. | |
| 10,182,659 B2 | 1/2019 | Chopra et al. | |
| 10,206,507 B2 | 2/2019 | Battey et al. | |
| 10,463,153 B2 | 11/2019 | Peterson et al. | |
| 10,518,887 B2 | 12/2019 | Mair et al. | |
| 10,557,491 B2 | 2/2020 | Schön | |
| 10,605,286 B2 | 3/2020 | Giovannetti | |
| 10,753,381 B2 | 8/2020 | Grabher et al. | |
| 10,772,422 B1 | 9/2020 | Chen et al. | |
| 10,844,892 B2 | 11/2020 | Matzler | |
| 2004/0155509 A1 * | 8/2004 | Smith, Jr. | A47C 7/42 |
| | | | 297/440.15 |
| 2017/0152878 A1 | 6/2017 | Kaplan | |
| 2018/0213940 A1 * | 8/2018 | Susie | A47C 7/546 |
| 2018/0355901 A1 * | 12/2018 | Trego | B25H 1/02 |
| 2019/0085886 A1 | 3/2019 | Schmidt et al. | |
| 2019/0343279 A1 | 11/2019 | Kampl et al. | |
| 2020/0214447 A1 | 7/2020 | Derelov et al. | |

FOREIGN PATENT DOCUMENTS

| | | | | |
|---|---|---|---|---|
| EP | 2881010 A1 | 6/2015 | | |
| EP | 3456988 A1 | 3/2019 | | |
| KR | 10-2011-0061818 | * | 6/2011 | ............. A47C 7/40 |
| WO | 2018/195209 A1 | 10/2018 | | |

* cited by examiner

TOOL-LESS FASTENING SYSTEM

CROSS-REFERENCE TO RELATED APPLICATION

This application claims priority to Provisional Application No. 62/971,581, filed Feb. 7, 2020, which is herein incorporated by reference in its entirety.

TECHNICAL FIELD

The present invention relates to chairs including a back support having a tool-less assembly to facilitate ease of assembly for the user.

BACKGROUND

Objects are often shipped in a disassembled form in order to minimize the space taken because of the costs associated with the transportation of larger items. However, the required assembly of shipped articles by the consumer can be a deterrent, especially when assembly is time consuming, difficult, and requires tools.

By way of example, furniture in an assembled state can occupy a significant amount of space but can be compacted into a smaller, more secure state when disassembled. Chairs are becoming a common article that is being shipped directly to consumers. Chairs including seating surfaces and back supports are used in various environments (e.g., office and home office settings) to facilitate occupant comfort and productivity. These chairs may be shipped with various components that require tools to complete the assembly of the chair (e.g., bolts requiring a hex key to fully secure the back to the seat).

SUMMARY

Various disclosed concepts relate to chair. According to one example ("Example 1"), the chair including a seat assembly including a support and a seat surface, the support having a first aperture passing therethrough; an interface coupled to the seat assembly, the interface comprising: an interface body having a first longitudinal end, a second longitudinal end, and a contact surface disposed between the first longitudinal end and the second longitudinal end; and a fastening element passing through the first aperture and coupled to the interface body; a seat back assembly removably coupled to the seat assembly via the interface, the seat back assembly comprising: a back support; and a receiver coupled to the back support, forming a receiver slot, and shaped to receive the interface body in the receiver slot.

According to another example further to Example 1 ("Example 2"), the chair further includes a stop block extending from the interface body proximate the second longitudinal end, the stop block including an inclined surface.

According to another example further to Example 2 ("Example 3"), the chair further includes a receiver block positioned on the receiver and configured to receive the inclined surface of the stop block.

According to another example further to Example 3 ("Example 4"), the interface body is drawn in a direction toward the cam lever when the cam lever is engaged.

According to another example further to Example 4 ("Example 5"), the receiver block provides a longitudinal stop for the stop block of the interface body when the interface body is received by the receiver and the cam lever is engaged.

According to another example further to Example 5 ("Example 6"), the inclined surface of the stop block of the interface body engages the receiver block when the interface body is received by the receiver and the cam lever is engaged.

According to another example further to Example 6 ("Example 7"), the interface body is a wedge-shaped block having a top surface, a bottom surface, a first side surface, and a second side surface wherein the top surface of the wedge-shaped block is larger relative to the bottom surface, such that the first side surface and the second side surface are non-parallel.

According to another example further to Example 7 ("Example 8"), the chair further includes a bolt and a spring, wherein the spring is disposed about the bolt and the bolt extends from the interface body proximate the first longitudinal end of the interface body.

According to one example ("Example 9"), a tool-less fastening system is included. The tool-less fastening system has an interface assembly comprising: an interface body having a first longitudinal end, a second longitudinal end, and a contact surface disposed between the first longitudinal end and the second longitudinal end; a fastening element coupled to the interface body; and a stop block extending from the interface body at the second longitudinal end, the stop block including an inclined surface; and a receiver shaped to receive the interface body, the receiver comprising: a receiver body defining a channel; and at least one receiver block extending from the receiver body into the channel, wherein the at least one receiver block includes a receiving surface for receiving the contact surface of the interface body.

According to another example further to Example 9 ("Example 10"), the at least one receiver block further includes a distal surface for engaging the inclined surface of the stop block when receiver and the interface assembly are engaged.

According to another example further to Example 10 ("Example 11"), the interface body is a wedge-shaped block having a top surface, a bottom surface, a first inclined side surface, and a second inclined side surface, wherein the top surface of the wedge-shaped block is larger relative to the bottom surface of the wedge-shaped block, and wherein the first inclined side surface and the second inclined side surface are non-parallel and form acute angles with the top surface and obtuse angles with the bottom surface.

According to another example further to Example 11 ("Example 12"), the contact surface includes the first inclined surface and the second inclined surface.

According to another example further to Example 12 ("Example 13"), the contact surface of the interface body is in contact with the at least one receiver block of the receiver when the interface assembly and the receiver are engaged.

According to another example further to Example 13 ("Example 14"), the receiver body further comprises a closed end at a distal end of the channel.

According to another example further to Example 14 ("Example 15"), the at least one receiver block is spaced from the closed end of the receiver body.

According to another example further to Example 15 ("Example 16"), the stop block of the interface assembly is at least partially disposed between the at least one receiver block and the closed end of the receiver body when the interface assembly and the receiver are engaged.

According to another example further to Example 16 ("Example 17"), the interface assembly is constrained in three dimensions relative to the receiver when the interface assembly and the receiver are engaged.

According to another example further to Example 17 ("Example 18"), the system further includes a furniture component coupled to the interface assembly.

According to another example further to Example 18 ("Example 19"), the furniture component includes a table leg.

According to another example further to Example 19 ("Example 20"), the furniture component includes a chair back.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

Figures 1A, 1B, 1C:
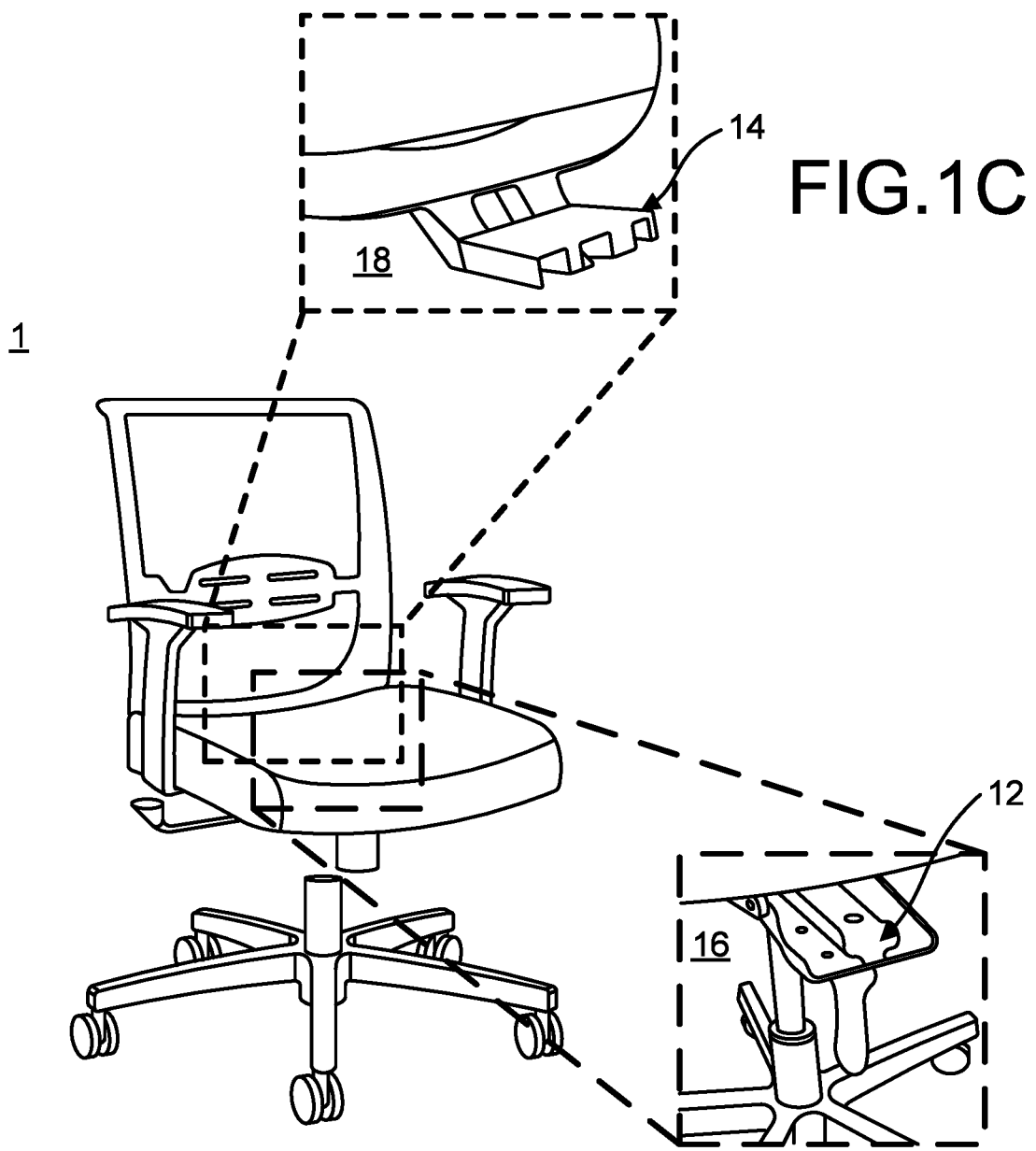
FIGS. 1a-1c are perspective views of a chair including a tool-less assembly system, according to some embodiments of the present disclosure.

It should be understood that the drawings are intended facilitate understanding of exemplary embodiments of the present invention are not necessarily to scale.

DETAILED DESCRIPTION

The following description refers to the accompanying drawings which show specific embodiments. Although specific embodiments are shown and described, it is to be understood that additional or alternative features are employed in other embodiments. The following detailed description is not to be taken in a limiting sense, and the scope of the claimed invention is defined by the appended claims and their equivalents.

It should be understood that like reference numerals are intended to identify the same structural components, elements, portions, or surfaces consistently throughout the several drawing figures, as such components, elements, portions, or surfaces may be further described or explained by the entire written specification, of which this detailed description is an integral part. Unless otherwise indicated, the drawings are intended to be read (for example, cross-hatching, arrangement of parts, proportion, degree, etc.) together with the specification, and are to be considered a portion of the written description.

Figure 2:
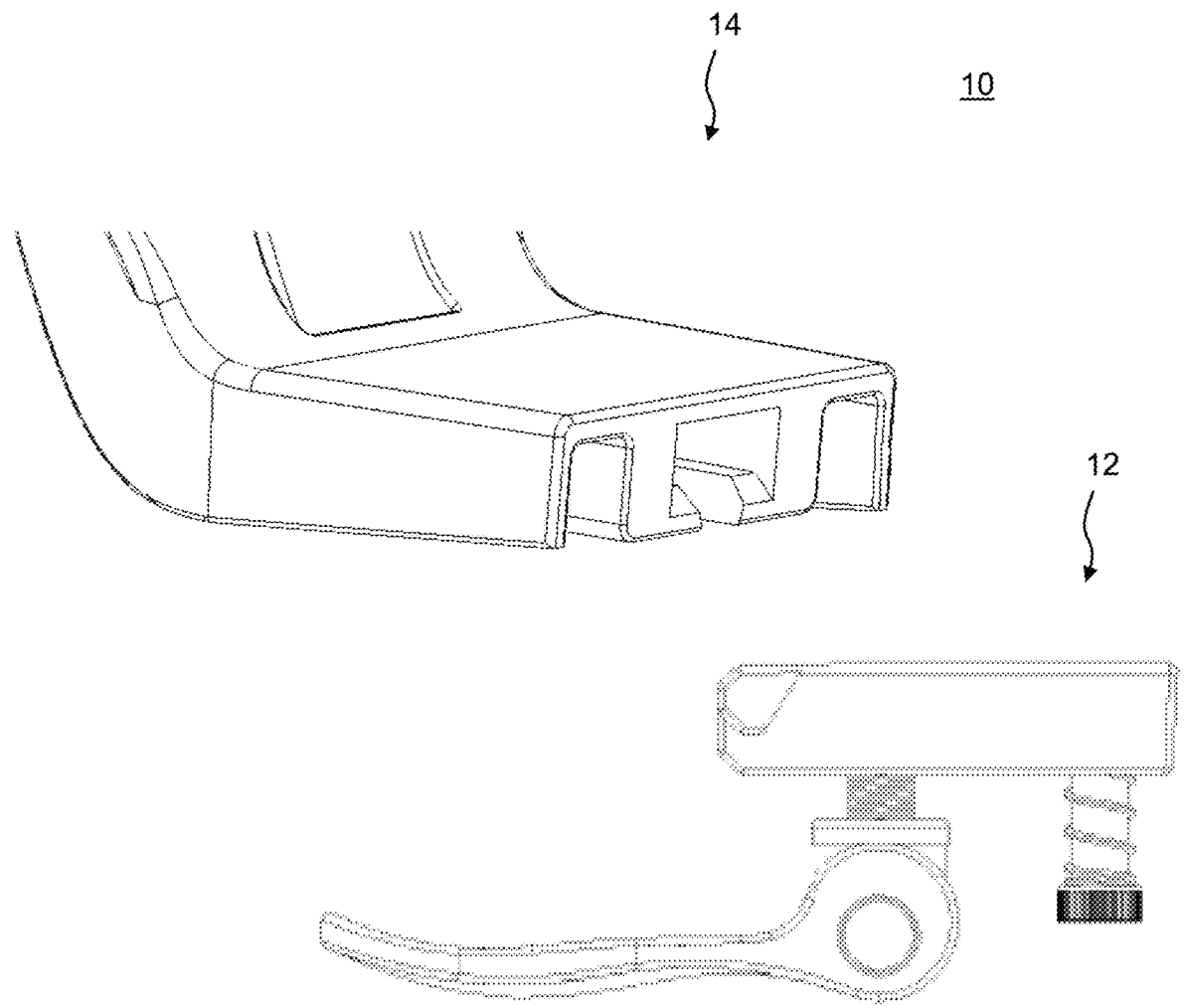
FIG. 2 is a perspective view of an assembly system including an interface assembly and a receiver, according to some embodiments of the present disclosure.

Referring to FIG. 1a-1c, a chair 1 is provided that implements an exemplary tool-less assembly system 10. FIG. 1c shows an exemplary embodiment of a chair back assembly of the chair 1 in which the chair back assembly 18 includes a receiver 14 of the tool-less assembly system 10 (shown as parts 14 and 16 in FIGS. 1b and 1b). The assembly system 10 includes the interface assembly 12 and the receiver 14 operable to removably couple with one another. The interface assembly 12 may be coupled to or extend from a first object, and the receiver 14 may be coupled to or extend from a second object. For example, when the assembly system 10 is used in conjunction with a chair, the interface assembly 12 may be coupled to a seat assembly 16, as seen if FIG. 1b, and the receiver 14 may extend from a chair back assembly 18, as seen in FIG. 1c. As will be further discussed, this disclosure is not limited to a chair assembly, but the systems and methods may be implemented for coupling various objects. In this example, the seat assembly 16 may be removably coupled to the chair back assembly 18 via the interface assembly 12 and the receiver 14. More specifically, the assembly system 10, including the interface assembly 12 and the receiver 14 permit the seat assembly 16 and the chair back assembly 18 to be coupled without the use of any tools, thus reducing the time and difficulty of assembling or disassembling a chair. FIG. 2 provides a more detailed view of the assembly system 10 including the interface assembly 12 and the receiver 14.

Figure 3A:
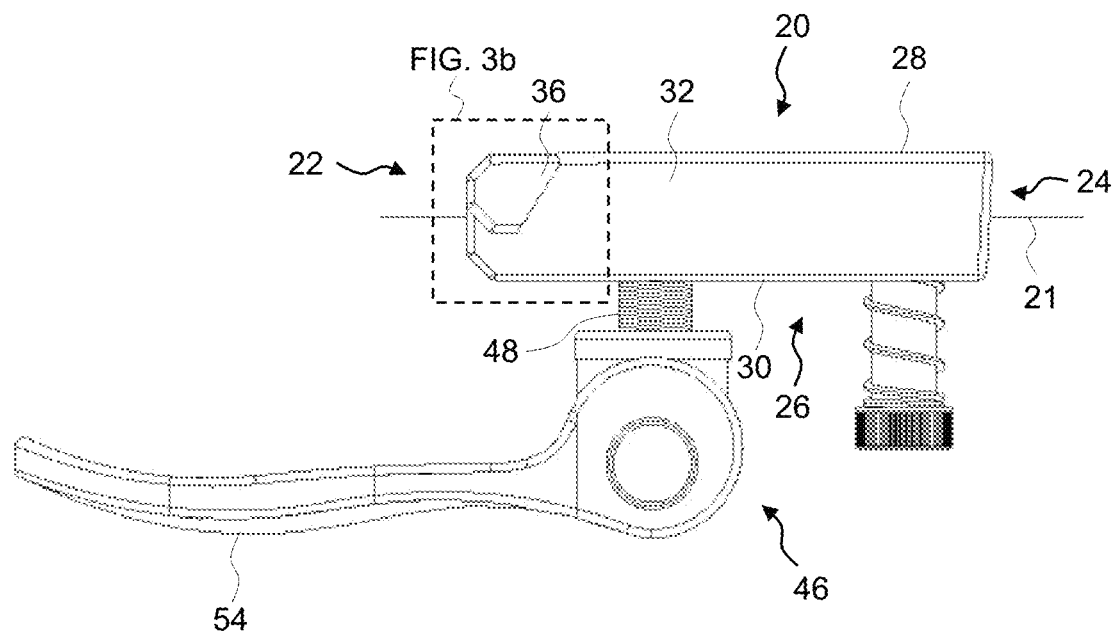
FIGS. 3a and 3b are side views of an interface assembly including an interface body having a stop block, according to some embodiments of the present disclosure.
Figure 3B:
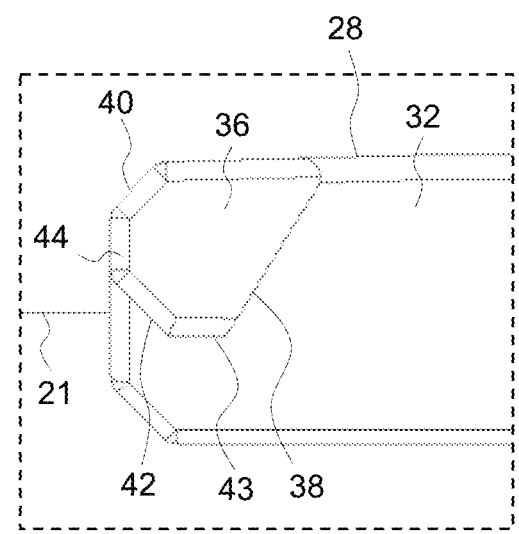
Figure 4:
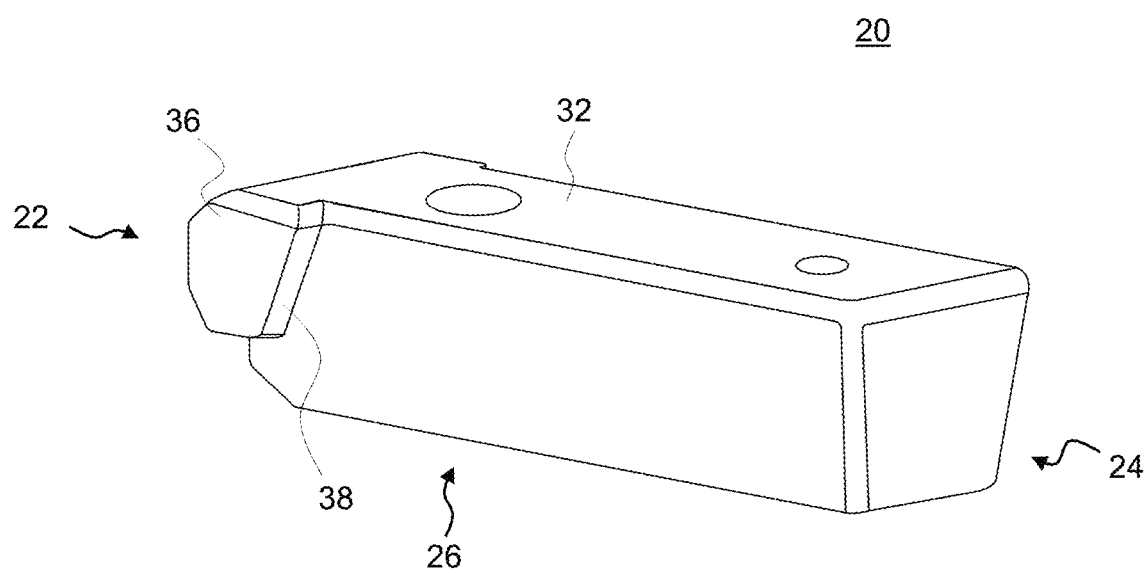
FIG. 4 is a perspective view of an interface body, according to some embodiments of the present disclosure.

Referring to FIGS. 3a, 3b and 4, an interface 12 is shown in greater detail. An interface assembly 12 includes an interface body 20 having a first longitudinal end 22, a second longitudinal end 24, and a contact surface 26 disposed between the first longitudinal end 22 and the second longitudinal end 24. The contact surface 26 may include several various shapes, profiles, or geometries, some of which depend upon the nature of the interface body 20 and will therefore be described in more detail herein.

In one embodiment, the interface body 20 is a substantially wedge-shaped block disposed about a longitudinal axis 21. In this embodiment, the interface body 20 includes an upper wall 28, a lower wall 30, a first side wall 32, and a second side wall 34 (not shown). In order to form a wedge-shaped block, the upper wall 28 is wider relative to the lower wall 30, which results in the first and second side walls 32, 34 being disposed non-parallel relative to each other. Thus, the upper, lower, first side, and second side walls 28, 30, 32, 34 are formed such that their geometry forms a trapezoid. In this embodiment, the first and second side walls 32, 34 form the contact surface 26 of the interface body 20. Other embodiment may include other geometry that contribute to the coupling of the interface assembly 12 and the receiver 14 and will result in a different contact surface 26.

The interface body 20 may also include a stop block 36 extending from the interface body 20, or in some embodiments a plurality of stop blocks 36 extend from the interface body 20. The stop blocks 36 may extend from any of the surfaces of the interface body 20; however, in one embodiment stop blocks 36 extend from the first and second side walls 32, 34 of the interface body 20. The stop blocks 36 may be positioned at, proximate, or closer to the second longitudinal end 24 relative to the first longitudinal end 22. Furthermore, the stop blocks 36 may be positioned on the interface body 20 such that the stop block 36 is flush with the upper wall 28 of the interface body. In some embodiments the stop block 36 does not extend the height of the side walls 32, 34 and therefore is not flush with the lower wall 30. However, in some embodiments, the stop blocks 36 may be positioned on the interface body 20 at various locations that may be advantageous to various geometries that may be implemented in conjunction with the disclosed devices.

The stop blocks 36 may include a first inclined surface 38 to limit movement along the longitudinal axis 21 once the interface body has been installed and secured as will be disclosed hereafter. The first inclined surface 38 may be disposed at an angle between 0 degrees and 90 degrees relative to the upper wall 28 of the interface body 20. The first inclined surface 38 may be positioned on the stop blocks 36 such that the first inclined surface 38 may be textured to provide certain properties such as increased traction. The stop blocks 36 may also include a bottom wall 43 that is substantially parallel to the lower wall 30 of the interface body 20 but is positioned at a different elevation relative to the interface body 20. The stop blocks 36 may also include a second inclined surface 40 and a third inclined surface 42. The second and third inclined surfaces 40, 42 may permit the interface body 20 to be more smoothly or easily installed. The second and third inclined surfaces 40, 42 may act to deflect the first longitudinal end 22 of the interface body 20 into the appropriate position to be installed when in use. In some embodiments, the first longitudinal end 22 of the interface body 20 includes other inclined surfaces 44 which are either flush with or separate from the second and third inclined surface 40, 42. The other inclined surfaces 44 may also promote insertion and installation of the interface body 20.

Figure 9:
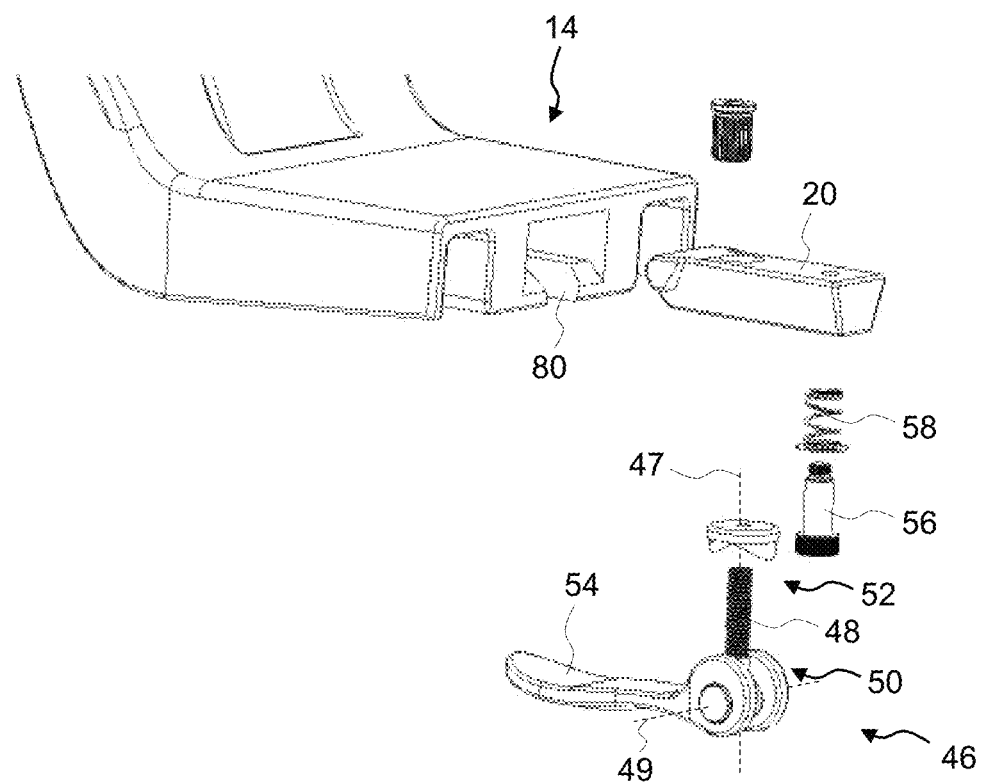
FIG. 9 is a perspective view of a receiver and an exploded, component view of an interface assembly, according to some embodiments of the present disclosure.

Referring to FIG. 3a, the interface body 20 includes a fastening element 46. The fastening element 46 is operable to draw the interface body 20 in a vertical direction. As shown in FIG. 2, the fastening element may include a pin 48 extending from the lower wall 30 of the interface body 20. The pin 48 can either be integral with or coupled to the interface body 20. As can be seen in FIG. 9, the pin 48 extends through the interface body 20 and out of the lower wall 30. The pin 48 may defined about a pin axis 47 that extends through the upper and lower walls 28, 30 of the interface body. The pin 48 may also include a first end 50 and a second end 52. The second end 52 may have a transverse pin axis 49 which is perpendicular to the pin axis 47. The second end 52 of the pin 48 may be coupled to a lever 54 which is operable to rotate about the transverse axis 49. In some embodiments, the lever 54 is a cam lever, which allows the cam lever to make contact with a surface and the pin 48 translates along the pin axis relative to the cam lever. However, the disclosure does not limit the fastening element 46 to only a pin 48 and cam lever 54, but may implement a variety of fastening elements (e.g., bolts and screws, ratchet mechanisms, etc.).

The interface body 20 may also include a second pin 56 with a spring 58. The second pin 56 may extend from the interface body 20. The second pin 56 can either be integral with or coupled to the interface body 20. As can be seen in FIG. 4, the second pin 56 extends fastens to the lower wall 30 of the interface body 20. The second pin 56 may extend from the lower wall 30 at, proximate, or closer to the first longitudinal end 22 relative to the second longitudinal end 24. The spring 58 may be disposed about at least a portion of the second pin 56 and provides a spring force which will be discussed in greater detail hereafter.

Figure 5:
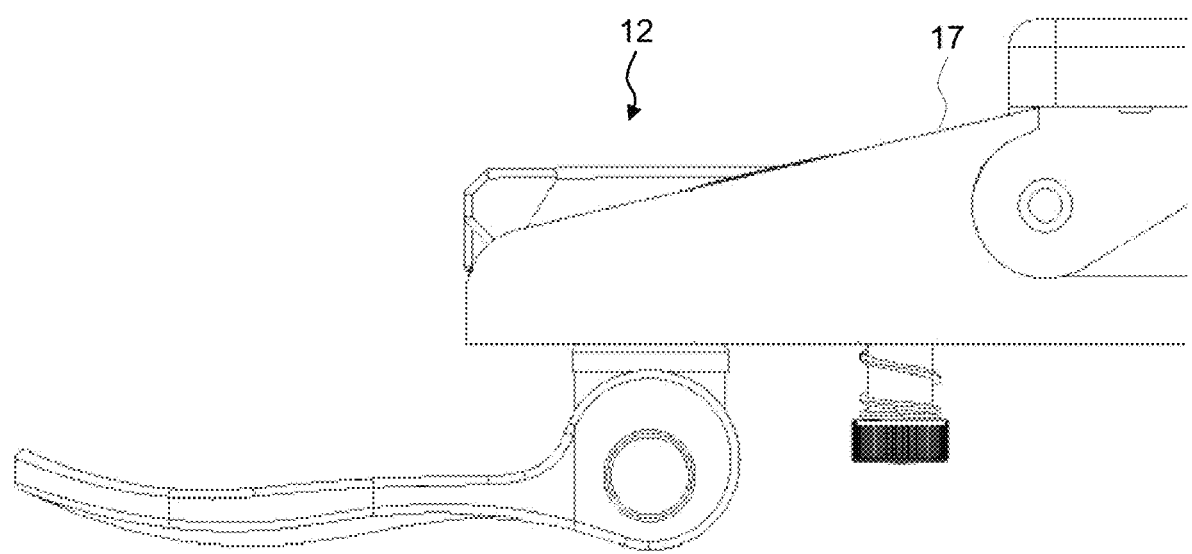
FIG. 5 is a side view of an interface assembly coupled to a component such as a controller for an office chair, according to some embodiments of the present disclosure.
Figure 6:
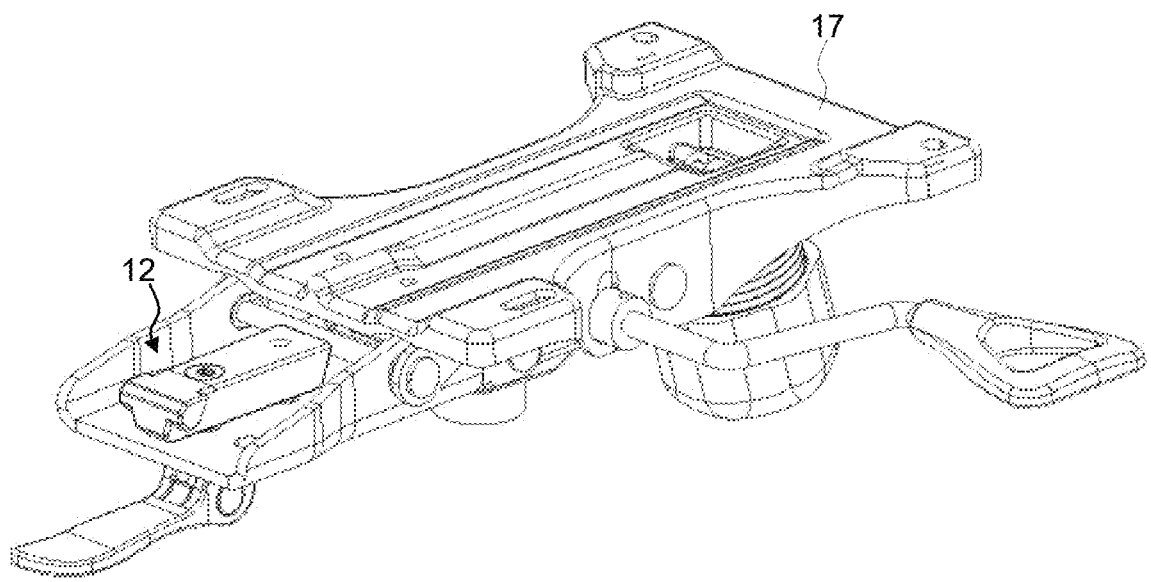
FIG. 6 is a perspective view of a controller for a chair with an interface assembly coupled thereto, according to some embodiments of the present disclosure.

Now referring to FIGS. 5 and 6, in some embodiments, the interface body 20 is coupled to the article to be assembled (e.g., a seat assembly, a table top, etc.) via the first and second pins 48, 56. The first and second pins 48, 56 may extend through apertures of the article such that the pins 48, 56 are able to translate through the apertures while still remaining coupled to the article. For example, the article may include a seat assembly 16 which includes a support 60. The support 60 may include a first aperture 62 and a second aperture 64. The first aperture 62 is operable to receive the first pin 48 and the second aperture 64 is operable to receive the second pin 56. This allows the interface body 20 to move relative to the support 60, which permits the action of the fastening element 46 for drawing in and releasing the interface assembly 12 when coupling. For example, the interface body may be coupled to a controller 17 for an office chair.

Figure 7:
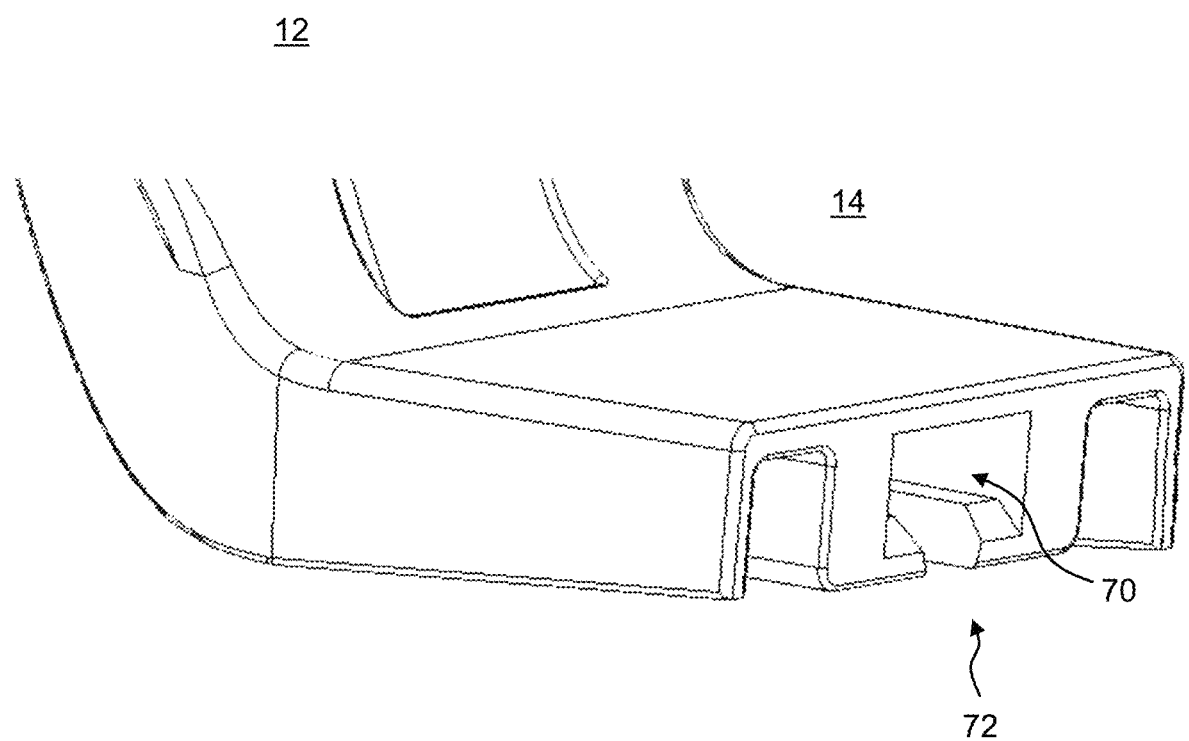
FIG. 7 is a perspective view of a receiver, according to some embodiments of the present disclosure.
Figure 8:
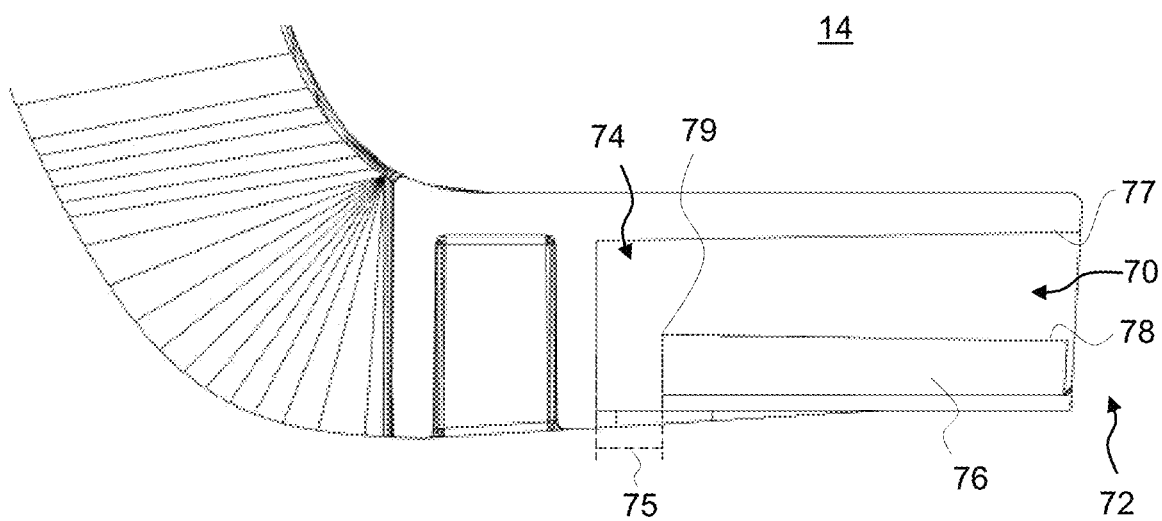
FIG. 8 is a sectional side view of a receiver, according to some embodiments of the present disclosure.

Referring now to FIGS. 7 and 8, the assembly system 10 includes a receiver 14 which is operated in connection with the previously described interface assembly 12. The receiver 14 is operable to be coupled to or extends directly from an article that is to be coupled by the assembly system 10 (e.g., a chair back, a table leg, etc.). The receiver 14 includes a receiver channel 70 defined in the receiver 14. The receiver channel 70 is operable to receive at least a portion of the interface assembly 12. The receiver channel 70 may include a first receiver end 72 and a second receiver end 74, wherein the first receiver end 72 is open to permit the interface body 20 to be introduced into and received by the receiver channel 70. In some embodiments the second receiver end 74 includes a closed end and in other embodiments it includes an open end. The receiver channel 70 may also include a receiver ceiling 77 and a receiver floor 78. The receiver ceiling 77 may define an interior surface of the receiver channel 70 and may extend the length of the receiver channel 70 from the first receiver end 72 to the second receiver end 74. The receiver floor 78 is opposite the receiver ceiling 77 and is at least partially open or exposed.

The receiver 14 may further include a receiver block or a plurality of receiver blocks 76. The receiver blocks 76 may be integrally formed on the receiver 14 or they may be coupled or attached by appropriate means. The receiver blocks 76 may extend from the first receiver end 72 towards the second receiver end 74. In some embodiments, the first receiver blocks 76 are axially spaced from the second receiver end 74. In those embodiments in which the second receiver end 74 includes a closed end, the receiver blocks 76 are axially spaced from the closed end in order to provide an axial gap 75 between the second receiver end 74 and the receiver blocks 76. However, in those embodiments in which the second receiver end 74 is an open end, the receiver blocks 76 may extend from the first receiver end 72 to the second receiver end 74. At or near the second receiver end 74, the receiver blocks 76 form a securing surface 79. The securing surface 79 is operable to contact the first inclined surface 38 of the stop block 36. The securing surface 79, as seen in FIG. 5, may include a right angle which may increase the stability of the contact between the securing surface 79 of the receiver 14 and the inclined surface 38 of the interface assembly 12. In other embodiment, the securing surface 79 may be disposed at an angle from 90 degrees to 180 degrees relative to an upper surface of the receiver block 76. The securing surface 79 may correspond to the pitch of the first inclined surface 38 of the stop block 36. Furthermore, in some embodiment the securing surface 79 may be textured to provide certain properties such as increased traction.

Referring now to FIG. 9, the receiver blocks 76 may include a receiving surface 80. The receiving surface 80 is operable to contact and receive a portion of the interface body 20. In order to create a close fit or an interference fit between the receiver blocks 76 and the interface body 20, the receiving surface 80 may by shaped to match the profile of the interface body 20. For example, in some embodiments the receiving surface 80 of the receiver blocks 76 is angled to correspond to the pitch of the contact surface 26 of the second side walls 32, 34 of the interface body 20. FIG. 6 demonstrates how in one embodiment when the interface body 20 includes a substantially wedge-shaped block, the receiver blocks 76 include a receiving surface 80 that is angled such that the first and second side walls 32, 34 (which form the trapezoid shape and are non-parallel) are operable to be received by the receiving surface 80 such that the receiving surface 80 and the first and second side walls 32, 34 are flush with each other. However, regardless of the shape and profile of the interface body 20, the receiving surface 80 may be formed to promote a secure fit between the receiving surface 80 and the first and second side walls 32, 34 of the interface body 20. It is to be understood that the first and second side walls 32, 34 of the interface body 20 may not have clear delineations, but in some embodiment represent regions or zones of the interface body (e.g., when the interface body 20 includes a cylindrical shape).

As previously disclosed, the interface assembly 12 and the receiver 14 are operable to be selectively coupled in such a way that provides quick and simple installation of various components. The interface assembly 12 may be coupled to the receiver 14 to constrain the interface assembly 12 in the receiver 14 for left and right, forward and backward, vertical, and rotational movement. The assembly system 10 also provides acceptable movement tolerances for many applications including furniture assembly.

Referring to the embodiments shown and described in connection with FIG. 9-, the assembly system 10 may be implemented in accordance with the following methods. The second longitudinal end 24 of the interface body 20 may be inserted into the first receiver end 72 of the receiver channel 70 of the receiver 14. Because the first receiver end 72 is open and the receiver channel 70 is shaped to accommodate the interface body 20, the second longitudinal end 24 of the interface body 20 is able to be inserted and advanced through the receiver channel 70. For ease of insertion, the interface body 20 includes various inclined surfaces 40, 42 which are operable to direct the interface body 20 into the correct position for and during insertion into the receiver channel 70.

Figure 13:
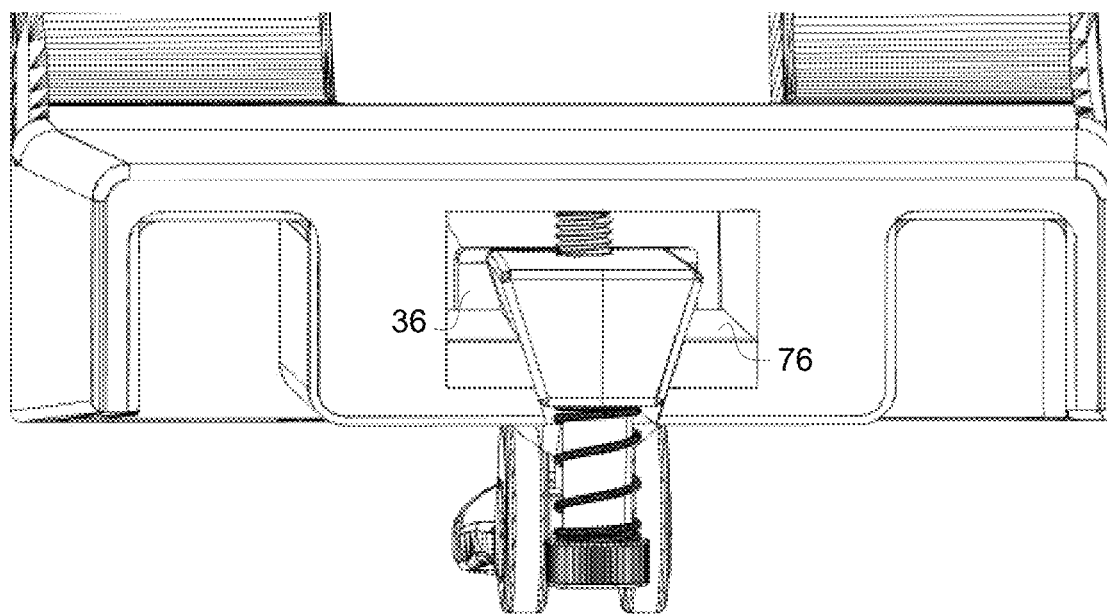
FIG. 13 is a perspective view of a receiver having a receiver channel, wherein an interface assembly is positioned therein, according to some embodiments of the present disclosure.
Figure 14:
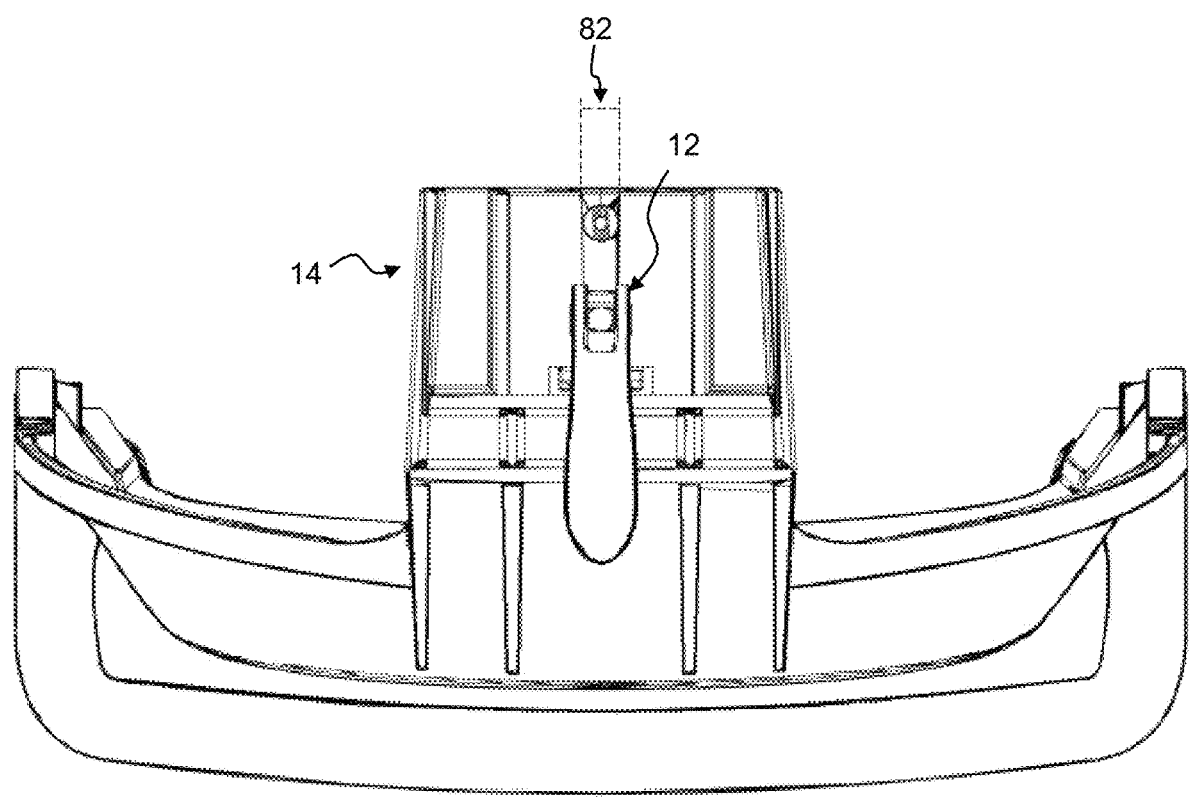
FIG. 14 is a bottom view of a receiver and an interface assembly engaged, according to some embodiments of the present disclosure.

As can be seen in FIGS. 10-12b, the fastening element 46 of the interface assembly 12 is not contained in the receiver channel 70. However, because the receiver 14 includes a receiver floor 78 that is at least partially open or exposed, the fastening element 46 and other attendant components do not interfere with the advancing of the interface body 20 into the receiver channel 70. The open portion or receiver slot 82 allows the other components to be extend outside of the receiver channel 70 (See FIGS. 13 and 14). Specifically, the fastening element 46 may be positioned between the receiver blocks 76 such that at least portions of the fastening element 46 are positioned exterior to the receiver channel 70 when the interface assembly 12 is installed in the receiver 14. Because the fastening element 46 extends outside of the receiver 14, the fastening element 46 may be manipulated to engage and to disengage the interface assembly 12 to and from the receiver 14.

As the interface body 20 is advanced through the receiver channel 70, the stop block 36 translates across the receiver blocks 76. The stop block 36. As the interface body 20 is advanced through the receiver channel 70, the bottom surface 43 of the stop block may remain in contact with the receiver blocks 76, thus interfering with the interface body 20 from fully seating against the receiver blocks 76 of the receiver 14. Once the interface body 20 has been advanced through the receiver channel 70 to the second receiver end 74, the bottom surface 43 of the stop blocks 36 may lose contact with the receiver blocks 76 and the interface body 20 will begin to seat against the receiver blocks 76. The bottom surface 43 of the stop blocks 36 may begin to lose contact with the receiver blocks 76 because the receiver 14 include an axial gap 75, and the stop blocks 36 advance to and into the axial gap 75. As discussed above, the axial gap 75 extends between the receiver blocks 76 and at least to the second receiver end 74, whether the second receiver end 74 is an open end or a closed end.

As the stop blocks 36 are at least partially advanced past the receiver blocks 76, the interface body 20 begins to seat against the receiving surface 80 of the received blocks 76. In some embodiments, interface body 20 is assisted in advancing into a securing position by the second pin 56 and the spring 58. The spring 58 may provide a spring force against a component (e.g., a seat assembly) which will provide a force against the second pin 56, which draws the interface body 20 in a direction towards the spring 58. This may result in the interface body 20 snapping into place relative to the receiver blocks 76. This may also naturally occur due to forces present such as a gravitational force. This allows for the interface assembly 12 to self-center with the receiver 14 in order to be positioned for locking or securement.

As mentioned, as the interface body 20 is advanced into the receiver channel 70, the interface body 20 will seat with the receiver blocks 76. The receiving surface 80 of the receiver 14 is operable to receive or be positioned against the interface body 20. More specifically, the interface body 20 may include surface, such as the first and second side walls 32, 34 that are operable to be positioned against the receiving surface 80 of the receiver 14. The corresponding surfaces of the interface assembly 12 and the receiver 14, when engaged and secured, may provide at least in part an interference fit for relative longitudinal movement between the interface assembly 12 and the receiver 14. These surfaces may also provide normal forces to prevent or minimize relative latitudinal and vertical translations and rotational movement when engaged.

Figure 10:
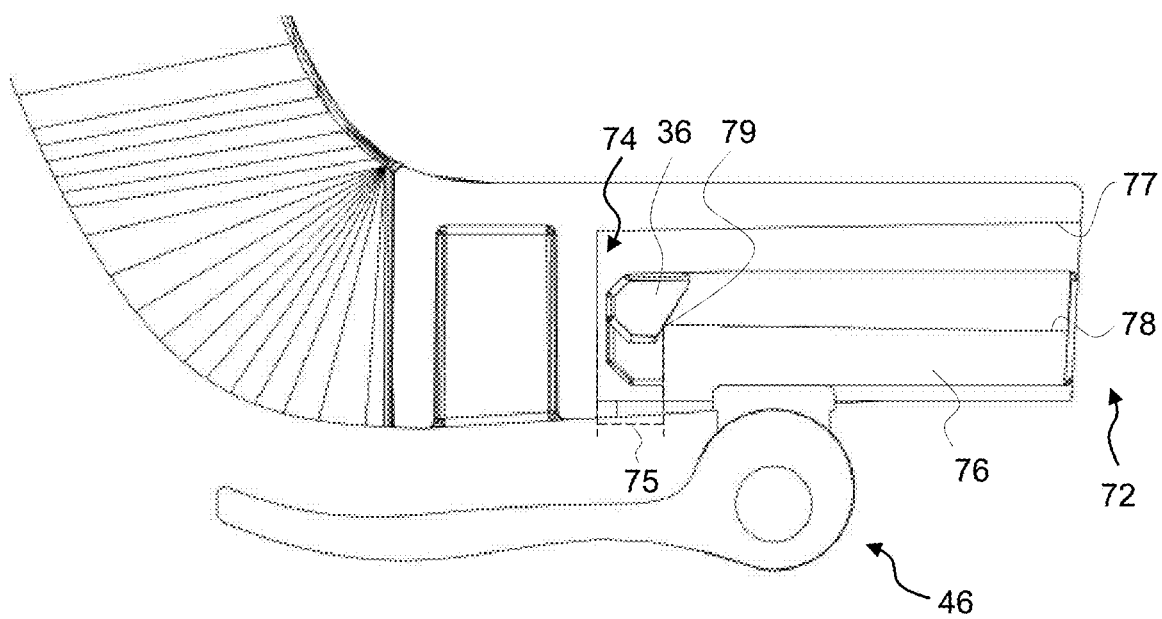
FIG. 10 is a sectional side view of a receiver with an interface assembly positioned therein, according to some embodiments of the present disclosure.
Figure 11:
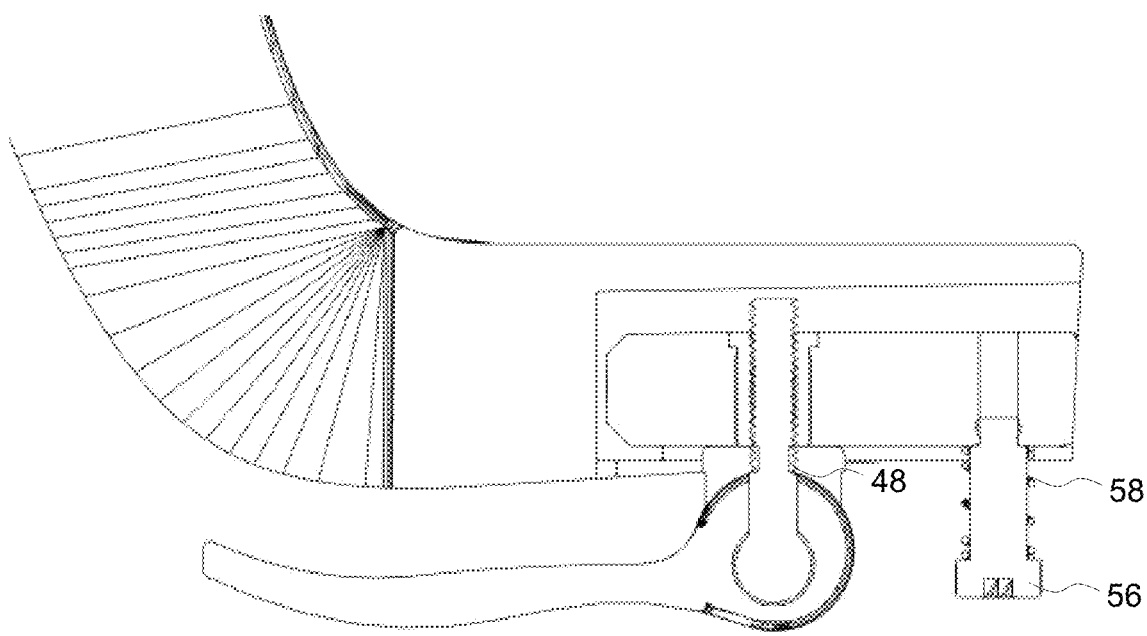
FIG. 11 is a sectional side view of a receiver and an interface assembly, according to some embodiments of the present disclosure.
Figure 12A:
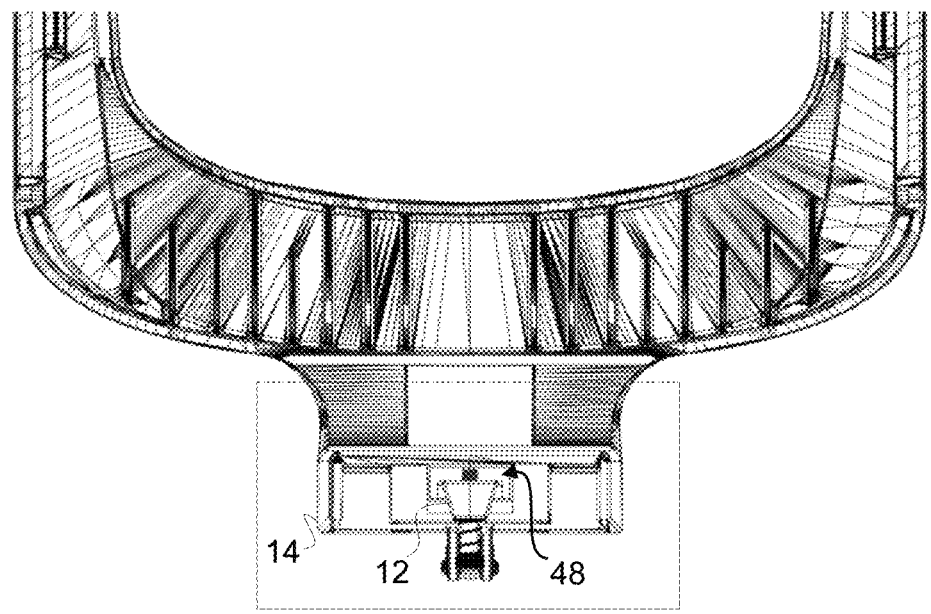
FIGS. 12a and 12b are front views of a receiver with an interface assembly positioned therein, according to some embodiments of the present disclosure.
Figure 12B:
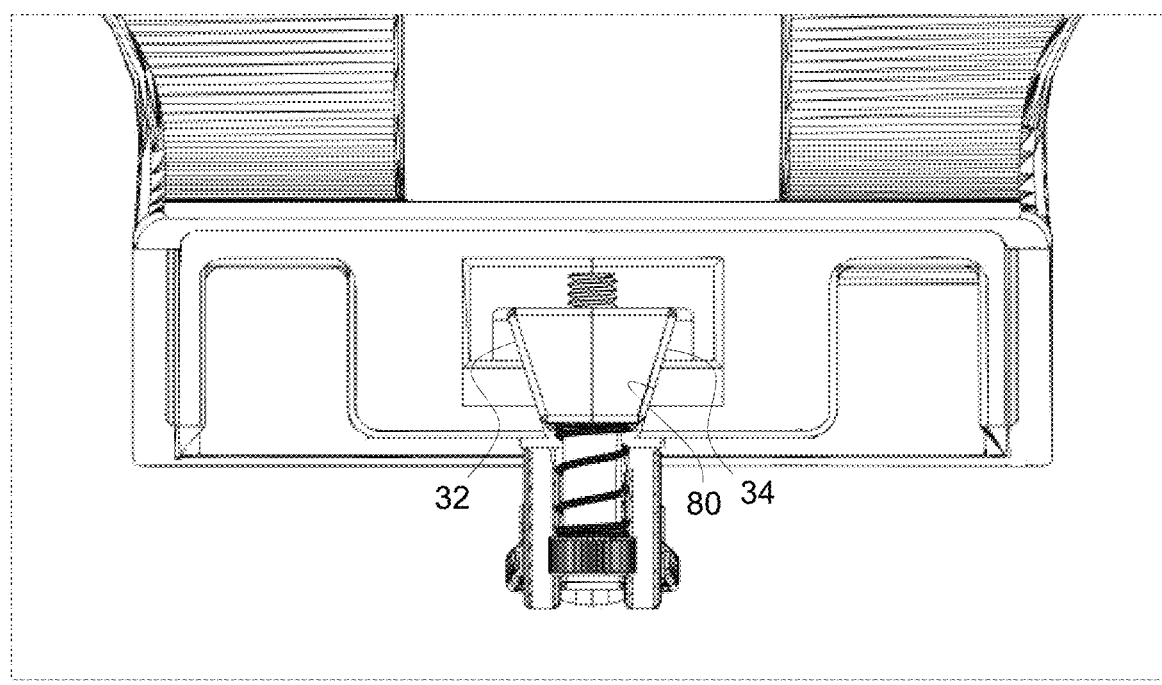

The receiver blocks 76 also provide a securing surface 79 to engage at least a portion of the stop blocks 36. As seen in FIG. 10, the securing surface 79 of the receiver 14 includes an edge. The edge is operable to be positioned against the first inclined surface 38 of the interface body 20. This engagement provides a normal force against the relative longitudinal movement of the interface assembly 12 and the receiver 14. It will be noted that various engagements are within the scope of the disclosure, including a securing surface 79 of the receiver 14 that is inclined to correspond to the first inclined surface 38 of the interface assembly 12.

Figure 15A:
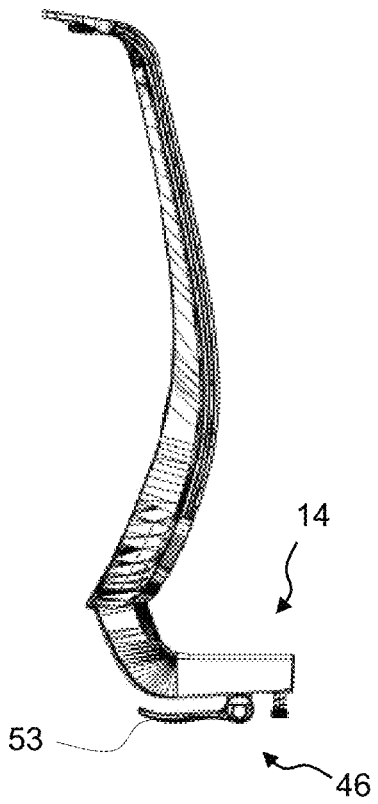
FIGS. 15a and 15b are side view of a chair back having a receiver, wherein the receiver is engaged and disengaged with an interface assembly, according to some embodiments of the present disclosure.
Figure 15B:
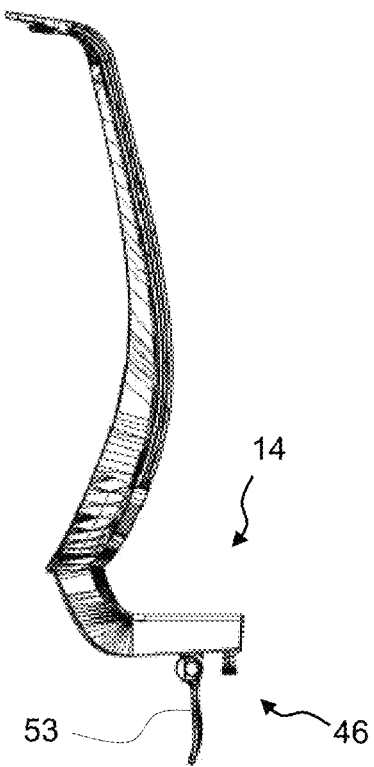

Once the interface assembly 12, and specifically the interface body 20, is positioned in with the receiver 14, the assembly system 10 may be engaged such that the interface assembly 12 and the receiver 14 are locked together. This may occur via the activation of the fastening element 46. As previously described, the fastening element 46 may include a cam system. As the cam lever 54 is rotated, the interface body 20 is drawn into and engaged with the receiver 14. The cam lever 53 may then be rotated to release the interface body 20 from the receiver 14. This may be seen in FIGS. 15a and 15b. It will be understood that various other components may be used to effectuate the engagement of the receiver 14 and the interface body 20, including a screw assembly, a spring assembly, or as otherwise recognized by one of skill in the art.

Figure 16A:
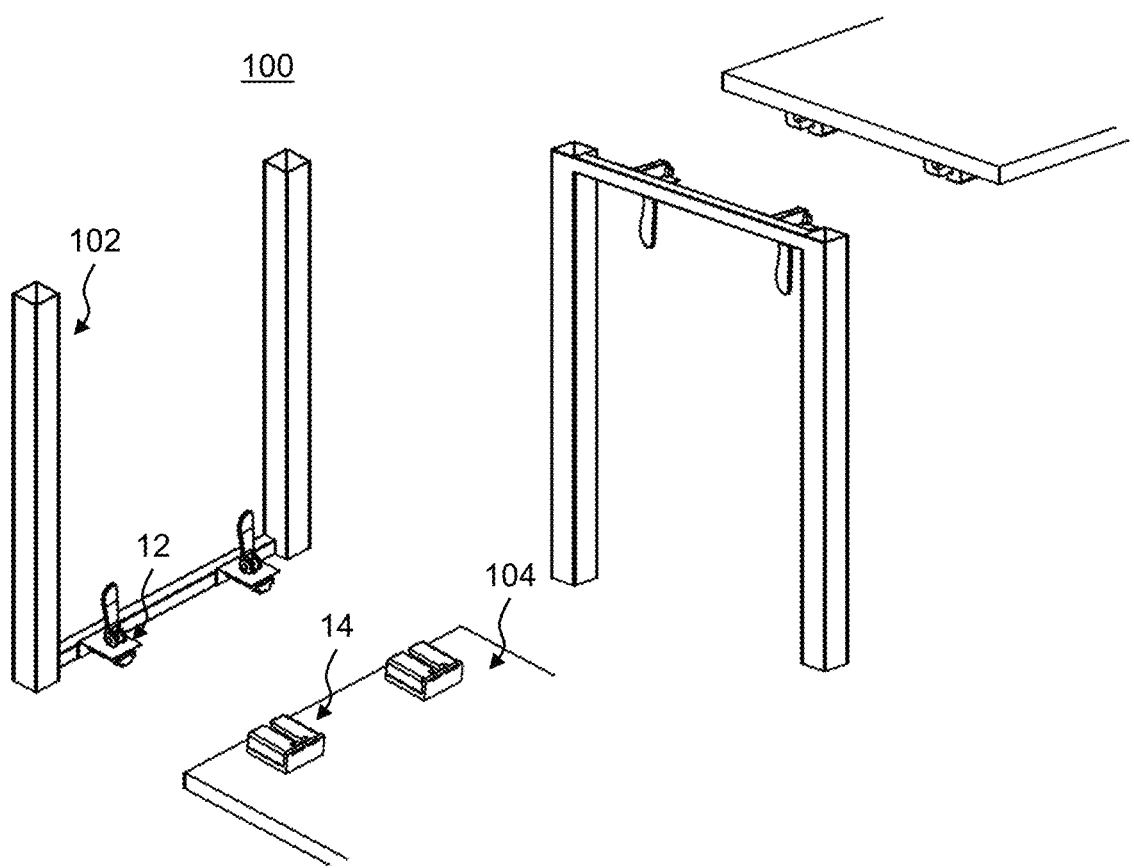
FIGS. 16a and 16b are perspective views of an assembly system implemented on a table, according to some embodiments of the present disclosure.
Figure 16B:
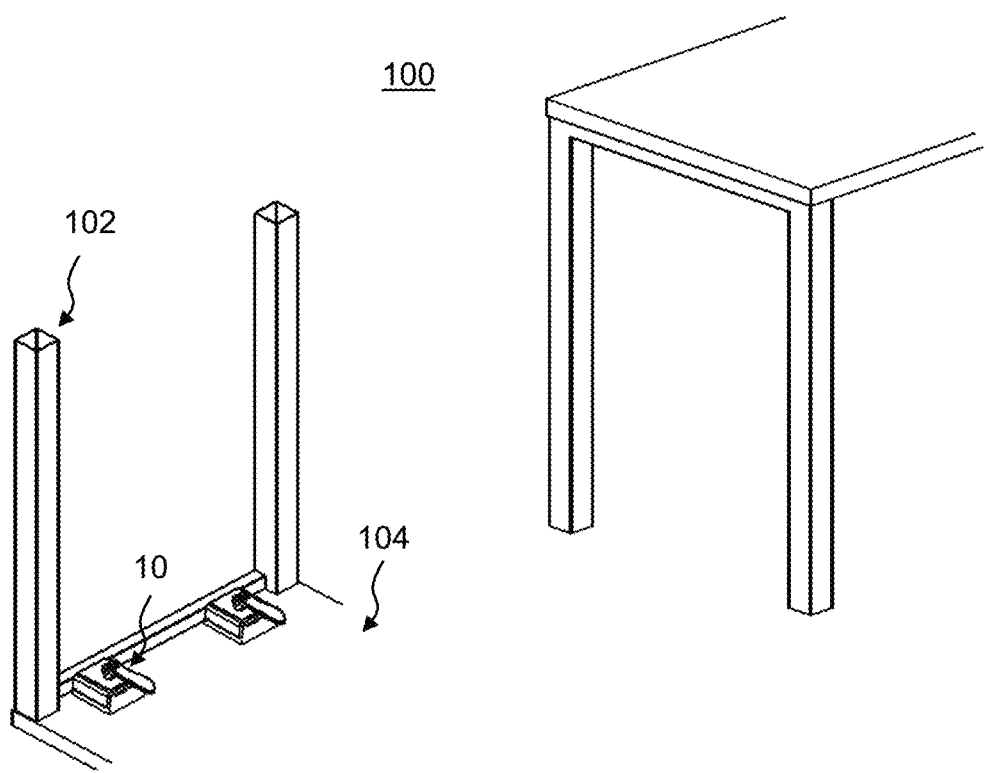

Furthermore, it is not outside of the scope of this disclosure that the assembly system 10 may be used in conjunction with a variety of objects, including assembled furniture. For example, the assembly system 10 may be implemented on a table 100 for fastening the legs 102 of a table to a table top 104, as shown in FIGS. 16a and 16b. Other applications may include mounting electronics, assembling toys, etc. Because the systems disclosed herein may be implemented on a variety of objects and in a variety of settings, the exemplary embodiments shown and described are not to be construed as limiting the disclosure to a specific application.

It is also to be understood that the assembly system 10 may be implemented such that the various components include various shapes (e.g., the receiver and the interface assembly include a cylindrical and complimentary shape, hexagonal and complimentary shape, pentagonal and complimentary shape, rhombus and complimentary shape, and so forth).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The invention claimed is:

1. A chair, comprising:
a seat assembly including a support and a seat surface, the support having a first aperture passing therethrough and a second aperture;
an interface coupled to the seat assembly, the interface comprising:
an interface body having a first longitudinal end, a second longitudinal end, and a contact surface disposed between the first longitudinal end and the second longitudinal end;
a fastening element passing through the first aperture and coupled to the interface body;
a pin extending from the interface body and through the second aperture; and
a spring disposed about at least a portion of the pin between a head of the pin and the support, wherein the spring provides a spring force against the pin and the support that is operable to draw the interface body in a direction towards the spring and the support;
a seat back assembly removably coupled to the seat assembly via the interface, the seat back assembly comprising:
a back support; and
a receiver coupled to the back support, forming a receiver slot, and shaped to receive the interface body in the receiver slot, wherein the receiver comprises a receiver body including a first end, a second end, an upper end, and a lower end, the receiver defining a channel extending from the first end toward a second end, the channel being open at the first end and at least partially open at the lower end extending from the first end toward the second end to define a pin slot, wherein the pin slot is defined between a first interior side wall and a second interior side wall, and the channel receiving the interface body therein with the fastening element and pin extending through the pin slot, and wherein the receiver body includes a receiving surface within the channel for receiving the contact surface of the interface body.

2. The chair of claim 1, further comprising a stop block extending from the interface body proximate the second longitudinal end, the stop block including an inclined surface.

3. The chair of claim 2, further comprising a receiver block positioned on the receiver and configured to receive the inclined surface of the stop block.

4. A tool-less fastening system, comprising:
an interface assembly comprising:
a support including an aperture defined therethrough;
an interface body coupled to the support and having a first longitudinal end, a second longitudinal end, a contact surface disposed between the first longitudinal end and the second longitudinal end, and a stop block extending from the interface body at the second longitudinal end, the stop block including an inclined surface;
a fastening element coupled to the interface body;
a pin extending from the interface body and through the aperture of the support; and
a spring disposed about at least a portion of the pin and positioned between a head of the pin and the support, wherein the spring provides a spring force against the pin and the support operable to draw the interface body in a direction towards the spring and the support; and
a receiver shaped to receive the interface body, the receiver comprising:
a receiver body including a first end, a second end, an upper end, and a lower end, the receiver defining a channel extending from the first end toward the second end, the channel being open at the first end and at least partially open at the lower end extending from the first end toward the second end to define a pin slot, wherein the pin slot is defined between a first interior side wall and a second interior side wall, and the channel receiving the interface body therein with the fastening element and pin extending through the pin slot; and at least one receiver block extending from the receiver body into the channel, wherein the at least one receiver block includes a receiving surface for receiving the contact surface of the interface body.

5. The tool-less fastening system of claim 4, wherein the at least one receiver block further includes a distal surface for engaging the inclined surface of the stop block when receiver and the interface assembly are engaged.

6. The tool-less fastening system of claim 5, wherein the interface body is a wedge-shaped block having a top surface, a bottom surface, a first inclined side surface, and a second inclined side surface, wherein the top surface of the wedge-shaped block is larger relative to the bottom surface of the wedge-shaped block, and wherein the first inclined side surface and the second inclined side surface are non-parallel and form acute angles with the top surface and obtuse angles with the bottom surface.

7. The tool-less fastening system of claim 6, wherein the contact surface includes the first inclined surface and the second inclined surface.

8. The tool-less fastening system of claim 7, wherein the contact surface of the interface body is in contact with the at least one receiver block of the receiver when the interface assembly and the receiver are engaged.

9. The tool-less fastening system of claim 8, wherein the receiver body further comprises a closed end at a distal end of the channel.

10. The tool-less fastening system of claim 9, wherein the at least one receiver block is spaced from the closed end of the receiver body.

11. The tool-less fastening system of claim 10, wherein the stop block of the interface assembly is at least partially disposed between the at least one receiver block and the closed end of the receiver body when the interface assembly and the receiver are engaged.

12. The tool-less fastening system of claim 11, wherein the interface assembly is constrained in three dimensions relative to the receiver when the interface assembly and the receiver are engaged.

13. The tool-less fastening system of claim 12, further comprising a furniture component coupled to the interface assembly.

14. The tool-less fastening system of claim 13, wherein the furniture component includes a table leg.

15. The tool-less fastening system of claim 13, wherein the furniture component includes a chair back.

16. The tool-less fastening system of claim 4, wherein the interface body is operable to translate within the channel from the first end toward the second end.

17. The tool-less fastening system of claim 4, wherein the lower end of the receiver body includes a receiver floor defining receiver blocks.

18. The tool-less fastening system of claim 17, wherein the receiver blocks extend from the first end towards the second end.

19. The tool-less fastening system of claim 18, wherein the receiver blocks are axially spaced from the second end.

* * * * *